United States Patent
Carcagno et al.

(10) Patent No.: US 8,186,722 B2
(45) Date of Patent: May 29, 2012

(54) SUPER HIGH TORQUE DOPE-FREE THREADED JOINT

(75) Inventors: Gabriel E. Carcagno, Buenos Aires (AR); Francisco Alfredo Quiroga, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 226 days.

(21) Appl. No.: 12/596,291

(22) PCT Filed: Mar. 27, 2008

(86) PCT No.: PCT/EP2008/053602
§ 371 (c)(1),
(2), (4) Date: Nov. 10, 2009

(87) PCT Pub. No.: WO2008/116891
PCT Pub. Date: Oct. 2, 2008

(65) Prior Publication Data
US 2010/0181762 A1 Jul. 22, 2010

Related U.S. Application Data

(60) Provisional application No. 60/907,301, filed on Mar. 28, 2007.

(51) Int. Cl.
*F16L 25/00* (2006.01)
(52) U.S. Cl. ........................ 285/333; 285/334
(58) Field of Classification Search .......... 285/333–334, 285/355, 390
See application file for complete search history.

(56) References Cited

U.S. PATENT DOCUMENTS

| | | | | |
|---|---|---|---|---|
| 4,988,127 | A | 1/1991 | Cartensen | 285/94 |
| 5,348,350 | A * | 9/1994 | Blose et al. | 285/94 |
| 5,419,595 | A | 5/1995 | Yamamoto et al. | 285/334 |
| 6,174,000 | B1 | 1/2001 | Nishi et al. | 285/333 |
| 6,454,315 | B1 * | 9/2002 | Yamaguchi | 285/334 |
| 6,481,760 | B1 * | 11/2002 | Noel et al. | 285/334 |
| 6,729,658 | B2 * | 5/2004 | Verdillon | 285/333 |
| 6,971,681 | B2 | 12/2005 | Dell'Erba et al. | 285/55 |
| 2002/0113436 | A1 * | 8/2002 | Verdillon | 285/333 |

FOREIGN PATENT DOCUMENTS

| | | |
|---|---|---|
| EP | 1411288 | 4/2004 |
| FR | 2855236 | 5/1995 |

OTHER PUBLICATIONS

E. Tsuru, et al., "Innovative Technology for Tubular Connection to Eliminate Thread-Compound Grease", SPE Drilling & Completion, vol. 13, No. 2, Jun. 1998, pp. 92-98.

\* cited by examiner

*Primary Examiner* — Aaron Dunwoody
*Assistant Examiner* — Fannie Kee
(74) *Attorney, Agent, or Firm* — Fitzpatrick, Cella, Harper & Scinto

(57) ABSTRACT

A high torque threaded joint comprising a box member having threads and a pin member having threads (10) configured and positioned to mate with the threads of the box member. There is a flank-to-flank contact thread profile using trapezoidal threads with both a positive and very low load flank angle, ($\beta 1$ or a); and a positive and very low stabbing flank (14) angle, ($\beta 2$, or b), wherein the threads are coated with a solid, dopefree surface treatment.

10 Claims, 7 Drawing Sheets

| SURFACE TREATMENT OF THREAD | RADIAL INTERFERENCE (mm) | LOAD ANGLE [β1,a] | STABBING ANGLE [β2,b] | TORQUE [lb*ft] |
|---|---|---|---|---|
| DOPE | 0 | 5 | 5 | 0 |
| DOPE | 0.1 | 5 | 5 | 790 |
| DOPE | 0.2 | 5 | 5 | 1,580 |
| DOPE | 0.3 | 5 | 5 | 2,370 |
| DOPE | 0.4 | 5 | 5 | 3,161 |
| DOPE | 0 | 3 | 3 | 0 |
| DOPE | 0.1 | 3 | 3 | 1,258 |
| DOPE | 0.2 | 3 | 3 | 2,516 |
| DOPE | 0.3 | 3 | 3 | 3,774 |
| DOPE | 0.4 | 3 | 3 | 5,031 |
| DOPE | 0 | 5 | 3 | 0 |
| DOPE | 0.1 | 5 | 3 | 965 |
| DOPE | 0.2 | 5 | 3 | 1,931 |
| DOPE | 0.3 | 5 | 3 | 2,896 |
| DOPE | 0.4 | 5 | 3 | 3,861 |
| DOPE-FREE | 0 | 5 | 5 | 0 |
| DOPE-FREE | 0.1 | 5 | 5 | 2,370 |
| DOPE-FREE | 0.2 | 5 | 5 | 4,741 |
| DOPE-FREE | 0.3 | 5 | 5 | 7,111 |
| DOPE-FREE | 0.4 | 5 | 5 | 9,482 |
| DOPE-FREE | 0 | 3 | 3 | 0 |
| DOPE-FREE | 0.1 | 3 | 3 | 3,774 |
| DOPE-FREE | 0.2 | 3 | 3 | 7,547 |
| DOPE-FREE | 0.3 | 3 | 3 | 11,321 |
| DOPE-FREE | 0.4 | 3 | 3 | 15,094 |
| DOPE-FREE | 0 | 5 | 3 | 0 |
| DOPE-FREE | 0.1 | 5 | 3 | 2,896 |
| DOPE-FREE | 0.2 | 5 | 3 | 5,792 |
| DOPE-FREE | 0.3 | 5 | 3 | 8,688 |
| DOPE-FREE | 0.4 | 5 | 3 | 11,584 |

*FIG. 5*

| LOAD ANGLE [β1 OR a.] | STABBING ANGLE [β2 OR b.] | TORQUE [LB*FT] |
|---|---|---|
| 3 | 0.5 | 9,420 |
| 3 | 1 | 8,292 |
| 3 | 2 | 6,713 |
| 3 | 3 | 5,660 |
| 3 | 4 | 4,908 |
| 3 | 5 | 4,344 |
| 3 | 8 | 3,267 |
| 3 | 12 | 2,501 |
| 3 | 16 | 2,058 |
| 3 | 20 | 1,770 |
| 3 | 25 | 1,529 |
| 3 | 30 | 1,364 |
| 3 | 45 | 1,103 |

*FIG. 8*

SUPER HIGH TORQUE DOPE-FREE THREADED JOINT

FIELD OF THE INVENTION

This invention is directed to a high torque threaded joint having a flank-to-flank contact thread profile, trapezoidal threads with both a positive and very low load flank angle, [$\beta_1$ or a.]; and a positive and very low stabbing flank angle, [$\beta_2$ or b.], wherein the threads are coated with a solid, dope-free surface treatment.

BACKGROUND OF THE INVENTION

In the oil and gas industries, there is a need for a threaded joint having "super high torque performance," which numerically means an overtorque capacity of about 40% of pipe body resistance. Conventional technologies generally provide up to about 20% overtorque capacity. There is limited prior art technology which is capable of reaching super high torque performance. One technology requires a wedge thread, and is illustrated by U.S. Pat. No. Re. 34,467 (Reeves) and WO 94/29627 (Mott). U.S. Pat. No. 6,412,831 (Noel et al.) discloses a variation on the wedge thread to achieve a high tightening torque.

The tapered wedge threads described in U.S. Pat. No. Re. 34,467 are known to provide an unusually strong connection that can control the stress and strain of the connected pin and box members within acceptable levels. For this reason, wedge threads are employed in many heavy-duty applications. The wedge threads generally have a dovetail shape, with load flanks and stab flanks that diverge outwardly to create crests that are substantially wider than the contiguous roots. This creates an interlocking thread form configuration, and the threads do not rely on shoulders to bear loads caused by make up. The dovetail shape of the threads, however, presents a problem in that unless the axial alignment of the joints is perfect during make up and break down, the edges of the threads of the pin and the box may contact. Such contact can prevent the pin from completely penetrating the box during make up and can cause damage to the threads.

WO 94/29627 is another example of wedge threads, having wider crests than the respective roots and both stab flanks and load flanks generally angled in the same direction, or with positive and negative angles as conventionally measured with respect to the longitudinal axis of the connection. Such a configuration can decrease the chances that the thread edges will come into contact during make up and break down, thus, minimizing risk of thread damage.

However, the wedge thread configurations disclosed in the '627 publication, and the '467 patent have the common disadvantage of a very low energy absorption to the final torque point; a low fatigue resistance due to the high stress present in the last engaged thread; and a higher tendency for disengagement, which commonly is known as spring back. Such wedge thread connections require tight machining tolerances, which makes them difficult and expensive to manufacture, as well as difficult to inspect for defects. Still further, the acute angles of the wedge threads disposed on the load flank side and/or the stabbing flank side have sharp cuts that are deleterious to the function of the connection. Such threads also become more fragile during use as a consequence of thread root notching, that is caused by the shape angles.

U.S. Pat. No. 6,412,831 discloses a threaded connection of two metal pipes, which includes a tapered thread with one type of male trapezoidal threads on a pin element and a mating female trapezoidal thread on the box element. While the width of the thread at the crest is less than the width of the thread at the root, that is achieved by a small, negative load flank angle (a. is preferably −3°) paired with a much larger positive stabbing flank angle (b. is preferably 13°), which combine to define an included angle ($\delta_\theta$) between the load flank and stabbing flank surfaces that is still positive (preferably 10°). While the male and female elements are said to be able to reach a position beyond where two flanks of the male thread come into contact with two flanks of the female thread, it is emphasized that a viscous grease form of dope critically is required. (See column 8, line 46).

Hence, achieving a makeup with a higher torque requires a viscous grease with the modified wedge thread geometry illustrated in the '831 patent. This is disadvantageous. While there might not be any radial interference, the presence of the viscous dope creates a high pressure in both the crests and the roots, which diminishes the contact pressure between flanks, and results in a decrease in torque. For these reasons, as well as for environmental reasons, it is highly desirable to avoid the use of dope in order to reach a high torque value.

The advantages and disadvantages of conventional dope or grease (i.e., API 5A3, which is an API modified grease) as a thread treatment is known. A particular class of dry thread pretreatments, which do not require the application of dope or grease as a lubricant, also now are known, and such dry thread pretreatments are broadly referred to herein as "dope-free".

Applicants incorporate by reference herein to the disclosures of U.S. Patent Application Publication No. 2005/0176592 A1 for further details of a dope-free dry lubricant coating achieved by applying a dry film including an intrinsically conductive polymer to a thread surface. Applicants also incorporate by reference herein to the disclosures of U.S. Pat. No. 6,971,681 B2, for details of dry surface treatments of threads for use in the oil and gas extraction industry that increase both the corrosion resistance and galling resistance of a connection joint.

SUMMARY OF THE INVENTION

In one aspect, the present invention is directed to a threaded joint comprising a box member having threads and a pin member having threads configured and positioned to mate with the threads of the box member, wherein the box member and the pin member each have a flank-to-flank contact thread profile and low and positive load flank angles [$\beta_1$ or a.] and low and positive stabbing flank angles [$\beta_2$ or b.] which match on mating pins and boxes. The low and positive flank angles should be approximately 3° to approximately 15°, more preferably approximately 3° to approximately 10°, and most preferably approximately 3° to approximately 5°, as conventionally measured from a vertical axis that is normal to the centerline of the connection. These combinations of low, positive angle values define a trapezoidal thread with an included angle between the two flank surfaces of a thread ($\delta_\theta$) that will range from between 6° and 30° and preferably will be 8°. The threads of at least one of the box member and the pin member also may be chamfered.

The machined threads on either or both the box member and the pin member then are pretreated with a dope-free surface coating. The dope-free surface coating allows for full compliance with a disclosed mathematical model and avoids the effect of a pressure difference as between a make up and a break out. The unique combination of dope-free surface treatments and low, positive values for both the load and stabbing flank angles, cooperates to produce a surprisingly high torque connection that is consistent in either a make up or a break out of the connection. A high make-up and breakout torque is particularly advantageous for drilling operations employing rotation tools, because it reduces greatly the risk of disengagement (spring back).

These and other aspects of the present invention will be apparent upon consideration of the following detailed description taken in conjunction with the accompanying drawings, in which preferred embodiments of the present invention are described and illustrated.

BRIEF DESCRIPTION OF THE DRAWINGS

FIG. 5 is a TABLE illustrating variation of maximum torque for different configurations, with either an API dope or a dope-free coating, according to the present invention.

FIG. 8 is a TABLE illustrating variation of maximum torque for different configurations of thread geometry according to the present invention.

DETAILED DESCRIPTION OF THE PRESENT INVENTION

Figure 1:
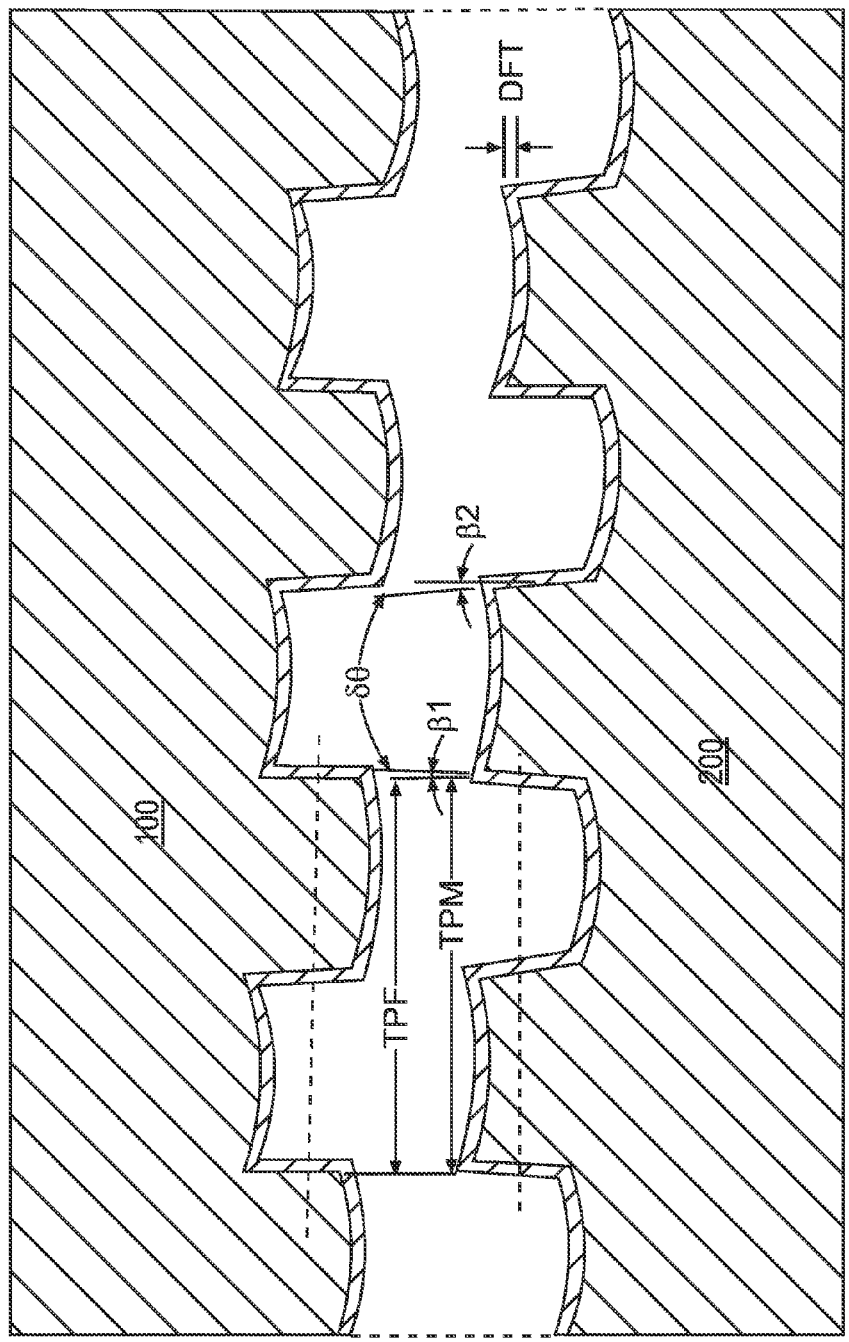
FIG. 1 schematically depicts, in explosion view, a thread configuration of a box and pin with trapezoidal threads each having a dope-free coating, according to the present invention, and FIG. 2 schematically depicts, in explosion view, a preferred thread configuration of a box and pin with trapezoidal threads chamfered or rounded between each flank surface and an adjoining crest surface or root surface, each surface of the threads having a dope-free coating according to the present invention.
Figure 2:
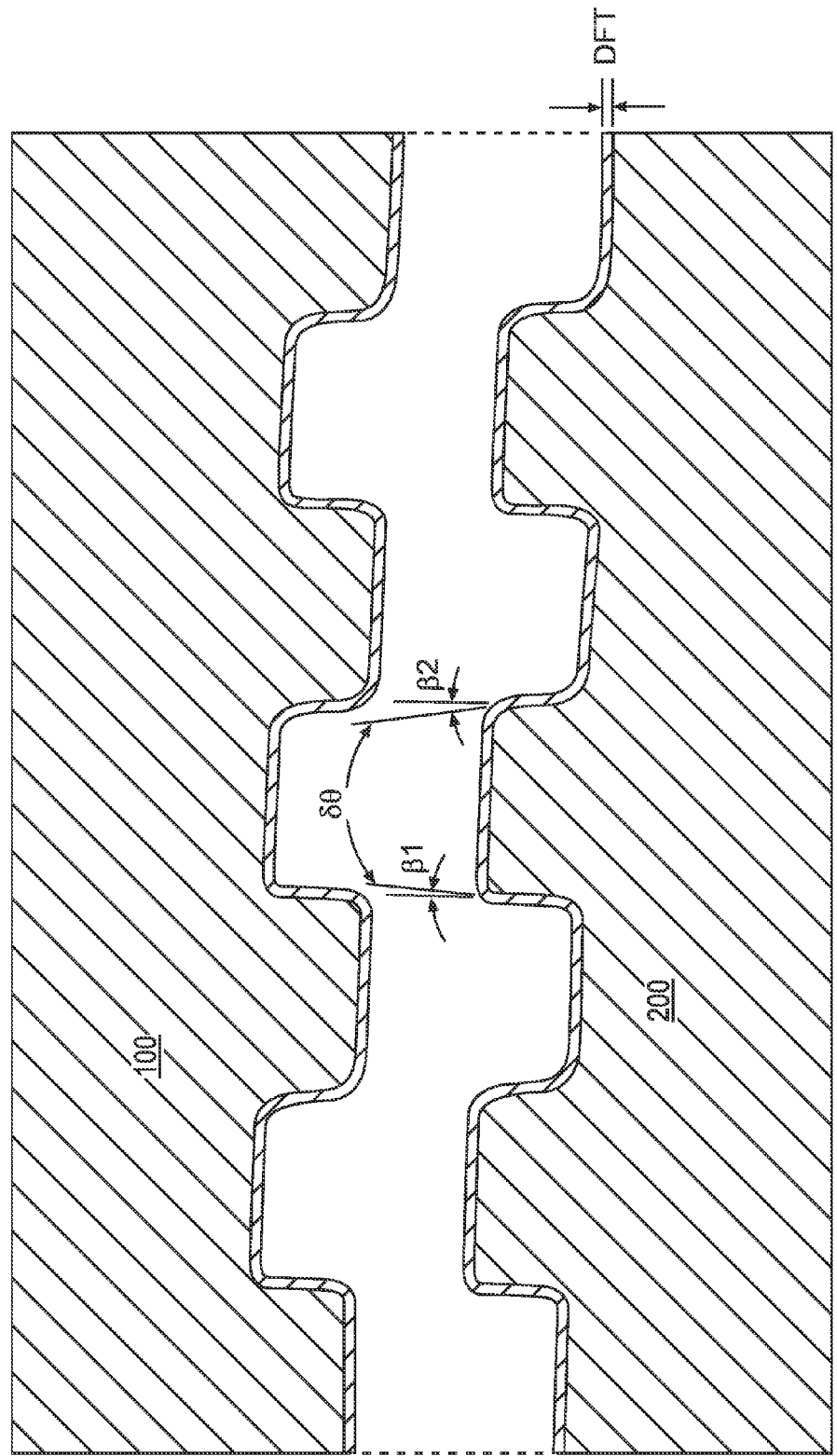

The present invention is directed to providing a threaded joint having a flank-to-flank contact thread profile that is defined by trapezoidal threads with both a positive and very low load flank angle, [$\beta_1$ or a.], and a positive and very low stabbing flank angle [$\beta_2$ or b.]. Specifically, the present invention is directed to providing a threaded joint comprising a box member 100 and a pin member 200 each having a flank-to-flank contact due to a trapezoidal thread profile with a preferred included angle between flanks of about 8° that is defined by very low, but positive load and flank angles that preferably each are between about 3° and 5°. Such threads for a box 100 and the pin 200 schematically are shown in FIGS. 1 and 2 after machining, and also after application of a dope-free coating.

Figure 3:
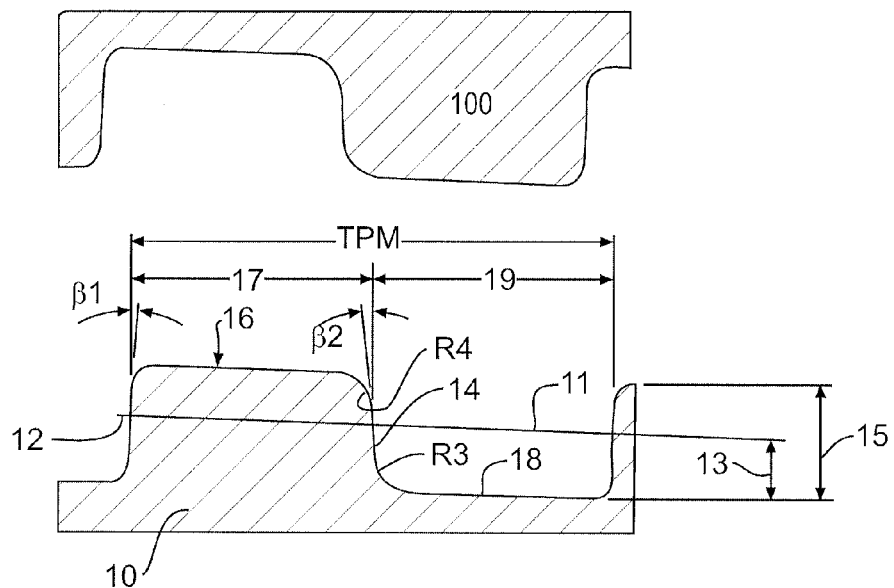
FIG. 3 depicts positive, low load and stabbing flank angles for a modified buttress type of trapezoidal thread configuration of a pin with preferred dimensions according to an embodiment of the present invention.
Figure 4:
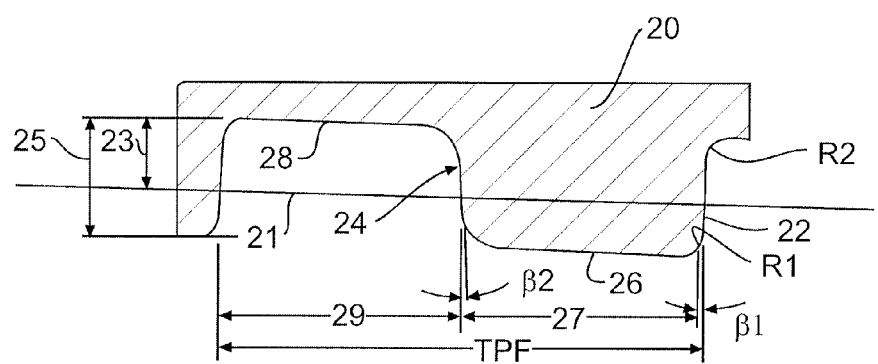
FIG. 4 depicts positive, low load and stabbing flank angles for a modified buttress type of a trapezoidal thread configuration of a box with preferred dimensions according to an embodiment of the present invention.

FIGS. 3 and 4 schematically show details of the preferred embodiment, comprising an OD of 3.5 inches and a modified buttress thread shape, wherein chamfers or rounds are applied to intersections of flank surfaces with either a crest surface or a root surface, and without the dope-free coating for clarity. FIG. 3 illustrates preferred, positive load and stabbing flank angles for a trapezoidal thread configuration of a pin 200 with preferred dimensions according to embodiments of the present invention. FIG. 4 illustrates preferred, positive load and stabbing flank angles for a trapezoidal thread configuration of a box 100 with preferred dimensions according to an embodiment of the present invention. The threads of the pin portion of the threaded joint and the box portion of the threaded joint each have a load flank angle [$\beta_1$ or a.] of about 3°, and a stabbing flank angle [$\beta_2$ or b.] of about 5°. The present invention, however, is not limited and contemplates useful, positive flank angles from approximately 3° to approximately 15° as measured from a plane perpendicular to the centerline of the connection. Preferably, the flank angle ranges from approximately 3° to approximately 10°. As shown in FIGS. 3 and 4, a load flank angle of 3° and a stabbing flank angle of 5° are defined by the machining The thin layer of a dope free coating to be applied to the threads of either or both the pin 200 and the box 100 after machining is very thin and uniform, and does not alter the geometry.

The following mathematical model derived from the mathematical theory of elasticity is used to calculate the expected torque for a determinate profile as a function of the thread flank angles:

$$T = \mu \cdot \pi \cdot \delta \cdot E \cdot (b^2 - a^2) \cdot (c^2 - b^2) \cdot \frac{[\sec(\beta_1) + \sec(\beta_2)]}{(1 - \nu^2) \cdot b \cdot (c^2 - a^2)} \cdot \left[ \frac{L}{\tan(\beta_1) + \tan(\beta_2)} + b \cdot \nu \right] \quad (1)$$

where:
T=torque;
µ=coefficient of friction;
δ=radial interference;
E=elasticity module;
a=internal radius;
b=thread medium radius;
$\beta_1$=load flank angle;
$\beta_2$=stabbing flank angle;
ν=Poisson coefficient; and
L=axial length of an active complete thread.
C=external radius Once the preferred flank profile of the pin 200 and box 100 has been determined, and box 100 and pin 200 members have been machined based on the preferred flank profile, the joint could be made up in either a doped or a dope-free state. However, it has been discovered that use of a viscous dope causes deviation from the above mathematical model due to the pressurized flow or movement over time of viscous dope trapped between flank surfaces and in spaces between a crest and a root portion of a mated thread. The dope in such a scenario can act as a non-compressive media homogenizing pressures in the crests and roots. The presence of the dope, therefore, has been found to make it very difficult to obtain full flank-to-flank contact at make-up. Surprisingly, the dope-free dry layer configurations taught herein allow for full compliance with the mathematical model. Additionally, with a dope-free coating the desired full flank-to-flank contact can be obtained at the initial make up of the joint, and there is no variation in time as with viscous dope.

In addition to the flank-to-flank contact thread profile and low flank angles, the thread profile according to the present invention preferably also include chamfers or rounded corners at intersections of a flank surface with a crest or root surface, in order to improve thread stabbing, as illustrated in FIGS. 1, 3 and 4. The crest and the root surfaces may have any profile and chamfer shape that is consistent with the angles for the load flank and stabbing flank surfaces that are disclosed herein. The present invention is not limited to any particular root or crest surface shape and modifications such as including a groove in one or both of the root and crest may be made without departing from the scope of the present invention. Additionally, the joint may be constructed with or without a torque shoulder. For example, if the torque is high enough, make up can be defined by position, without the need for a torque shoulder. Examples 1 and 2 do not include a torque shoulder. Examples 3 and 4 do include a torque shoulder.

Radial interference [δ] values for all embodiments are low and preferably range from about 0 to about 0.5 mm.

The connection of the present invention can be applied to every type of connection, particularly either in cases when the female member is formed at an end portion of a pipe or when a sleeve with two female members at both ends to join two male pipes is used. Useful materials for the connection are common carbon steels, stainless steels, or chromium alloy steels having a yield strength from about 552 MPa (80 ksi) to about 1034 MPa (150 ksi) and a preferred connection employs a grade L80 API steel. While a 3.5 inch OD embodiment is illustrated by FIGS. 3 and 4, preferred examples which follow are for a 4.5 inch OD connection and a 7 inch OD connection, which also are common API connector dimensions.

The trapezoidal thread combinations illustrated in explosion view by FIGS. 1 and 2 are provided to provide a schematic definition of particular references as used herein. The box 100 and pin 200 are characterized by tapered male and female threads that have a common load flank angle, $\beta_1$, a common stabbing flank angle $\beta_2$; a male thread pitch TPM that is the same as the female thread pitch, TPF and an included angle between the two flank surfaces of each male or female thread ($\delta_\theta$) which is positive and less than about 20°. As illustrated, the stabbing flank surfaces and load flank surfaces will make a substantial surface contact when mated. Upon those thread surfaces a thin dope-free layer comprising a dry lubricant has been applied, with a thickness, DFt, that is on the order of 10-20μm in thickness. FIG. 2 differs from FIG. 1 in that the flank surfaces intersect root and crest surfaces with a rounded or chamfered transition.

FIGS. 3 and 4 illustrate more details and dimensions of one embodiment having preferred, chamfered trapezoidal threads for both flank and stabbing surface contact between a pin 200 and a box 100 respectively, with the dope-free coating not shown for clarity. This illustration is for a modified buttress thread of 5 threads per inch, with flank to flank contact geometry. The following dimensions are representative for an OD of 3.5 inches, and demonstrate flank to flank contact geometry using very low, but positive load flank angles and very low, but positive stabbing flank angles.

FIG. 3 illustrates a pin 200 with a tapered male thread 10 of the modified buttress type with a load flank surface 12, a stabbing flank surface 14, a male thread crest surface 16, and a male thread root surface 18. The male thread pitch line 11 is spaced a distance 13 from crest that is 0.74 mm. The distance 15 between the root and the root surface is 1.27 mm. The thread width 17 at the pitch line is 2.54 mm. The flank surface spacing 19 at the pitch line is 2.54 mm. The low but positive load flank angle $\beta_1$ is 3° and the low but positive stabbing flank angle $\beta_2$ is 5°. The included angle between flank surfaces $\epsilon_\theta$ is 8°. The thread pitch TPM of the box 100 is 5.08 mm. The load flank chamfer R1 is 0.2 mm and the load flank round R2 is 0.2 mm. (shown in FIG.4)

FIG. 4 illustrates a box 100 with a tapered female thread 20 of the modified buttress type with a load flank surface 22, a stabbing flank surface 24, a female thread crest surface 26, and a female thread root surface 28. The female thread pitch line 21 is spaced a distance 23 from crest that is 0.74 mm. The distance 25 between the root and the root surface is 1.27 mm. The thread width 27 at the pitch line is 2.54 mm. The flank surface spacing 29 at the pitch line is 2.54 mm. The low but positive load flank angle $\beta_1$ is 3° and the low but positive stabbing flank angle $\beta_2$ is 5°. The included angle between flank surfaces $\delta_\theta$ is 8°. The stabbing flank round R3 is 0.4 mm and the stabbing flank chamfer R4 is 0.4 mm.(shown in FIG. 3)

DETAILED EXAMPLES

Example 1

In this first embodiment, the box 100 and pin 200 members have a flank-to-flank contact thread profile with a low, positive load flank angle [$\beta_1$ or a.=3°] and a low, positive stabbing flank angle [$\beta_2$ or b.=5°] for both the box member 100 and pin member 200 so as to define a trapezoidal thread with an included angle between flanks $\delta_\theta$ of 8°. Further parameters of this first example include:

Weight: 12.7 ppf;
Tpi: 5;
v: 0.32 (carbon steel)
OD: 4.5"; and
δ (radial interference): $1.5 \times 10^{-4}$ m The joint of this embodiment was made up with use of a dope, and particularly API 5A3, which is an API modified grease. As can be seen from Tables 1-1 and 1-2, below, the breakout torque was higher than the makeup torque making a significant difference as compared to with the use of dope-free technology, as shown below in Example 2. Also, note that the maximum torque values are much lower as compared to with the use of dope-free technology.

TABLE 1-1

| Makeup Run | Maximum Torque (ft-lbs.) | Shoulder Torque (ft-lbs.) | Delta Torque (ft-lbs.) | Shoulder Turns (revs) | Delta Turns (revs) | RPM at Shoulder | Final Turns |
|---|---|---|---|---|---|---|---|
| 1 | 2850 | 0 | 0 | 0 | 0 | 0 | 1.934 |
| 2 | 2316 | 0 | 0 | 0 | 0 | 0 | 1.646 |

TABLE 1-2

| Breakout Run | Maximum Torque (ft-lbs.) | Final Turns |
|---|---|---|
| 1 | 6299 | 2.833 |

Example 2

In this second embodiment, the same material and thread configuration of Example 1 is employed. The box 100 and pin 200 members have a flank-to-flank contact thread profile, a low, positive load flank angle [$\beta_1$ or a.] of 3° and a low, positive stabbing flank angle [$\beta_2$ or b.] of 5° for both the box member 100 and the pin member 200, so as to define a trapezoidal thread with an included angle between flanks [$\delta_\theta$] of 8°. The joint of this embodiment was made up with use of a two layer, dope-free solution coating that exhibited a dry lubricant and anticorrosion properties, according to the teachings of U.S. Pat. No. 6,971,681 B2, incorporated by reference herein. The first uniform layer was approximately 10 μm in thickness and comprised an epoxy resin containing particles of Zn as a dry corrosion inhibiting coating. The first layer was covered by a second uniform layer approximately 10 μm in thickness and comprised a mixture of MoS2 in an inorganic binder as a dry lubricant coating. As can be seen from Tables 2-1 and 2-2, below, the make up and break out torque values are significantly higher than the make up and break out torques of the equivalent dope embodiment, as detailed by Tables 1-1 and 1-2, above.

TABLE 2-1

| Makeup Run | Maximum Torque (ft-lbs.) | Shoulder Torque (ft-lbs.) | Delta Torque (ft-lbs.) | Shoulder Turns (revs) | Delta Turns (revs) | RPM at Shoulder | Final Turns |
|---|---|---|---|---|---|---|---|
| 1 | 10830 | 0 | 0 | 0 | 0 | 0 | 1.032 |
| 2 | 10320 | 0 | 0 | 0 | 0 | 0 | 0.93 |

TABLE 2-2

| Breakout Run | Maximum Torque (ft-lbs.) | Final Turns |
|---|---|---|
| 1 | 10140 | 1.03 |
| 2 | 9970 | 0.94 |

Example 3

In this third embodiment, both the box 100 and pin 200 members have a flank-to-flank contact thread profile, a low, positive load flank angle [$\beta_1$ or a.] of 3° and a low, positive stabbing flank angle [$\beta_2$ or b.] of 5° for the box 100 and pin 200 members so as to define a trapezoidal thread with an included angle between flanks [$\delta_\theta$] of 8°. The joint of Example 3 was a 4.5" connection of grade L80 API steel with a torque shoulder, having a weight of 12.6 pounds per feet (ppf) and a diametrical interference between 0 and 0.5 mm. Further parameters of this third embodiment include:

Weight: 12.7 ppf;

Tpi: 5;

v: 0.32 (carbon steel)

OD: 4.5"; and

δ (radial interference): $1.5 \times 10^{-4}$.

The joint of Example 3 was made up with use of a dope, and particularly API 5A3, which is an API modified grease. As can be seen from Tables 3-1 and 3-2, below, the breakout torque was higher than the makeup torque. Again, there is a significant difference as compared to the first embodiment, as detailed above wherein a dope-free technology is employed.

TABLE 3-1

| Makeup Run | Maximum Torque (ft-lbs.) | Shoulder Torque (ft-lbs.) | Delta Torque (ft-lbs.) | Shoulder Turns (revs) | Delta Turns (revs) | RPM at Shoulder | Final Turns |
|---|---|---|---|---|---|---|---|
| 1 | 3313 | 2143 | 1170 | 0.011 | 1.31 | 5.3 | 1.31 |
| 2 | 2688 | 1915 | 773 | 0.008 | 1.038 | 5.1 | 1.038 |

TABLE 3-2

| Breakout Run | Maximum Torque (ft-lbs.) | Final Turns |
|---|---|---|
| 1 | 6508 | 1.58 |
| 2 | 7850 | 1.263 |

Example 4

In this fourth embodiment, the same material and thread configuration of Example 3 is employed.

The box 100 and pin 200 members have a flank-to-flank contact thread profile and the load flank angle [$\beta_1$ or a.] is 3° and the stabbing flank angle [$\beta_2$ or b.] is 5° for both the box member 100 and the pin member 200, so as to define a positive, included flank angle [$\delta_\theta$] of 8°. The joint of this embodiment was made up with use of a dope-free solution coating with both lubricant and anticorrosion properties: a first uniform layer of a dry corrosion inhibiting coating and said first layer being covered by a second uniform layer of dry lubricant coating. The first uniform layer was approximately 10 μm in thickness and comprised an epoxy resin containing particles of Zn as a dry corrosion inhibiting coating. The first layer was covered by a second uniform layer approximately 10 μm in thickness and comprised a mixture of MoS2 in an inorganic binder as a dry lubricant coating.

As in Example 3, the joint of Example 4 was a 4.5" OD connection of grade L80 API steel with a torque shoulder, having a weight of 12.6 pounds per feet (ppf) and a low diametrical interference of between 0 and 0.5 mm.

As can be seen from Tables 4-1 and 4-2, below, the make up and break out torque values are significantly higher than the make up and break out torques of the embodiments in the comparative examples utilizing a dope, as shown in Tables 3-1 and 3-2.

TABLE 4-1

| Makeup Run | Maximum Torque (ft-lbs.) | Shoulder Torque (ft-lbs.) | Delta Torque (ft-lbs.) | Shoulder Turns (revs) | Delta Turns (revs) | RPM at Shoulder | Final Turns |
|---|---|---|---|---|---|---|---|
| 1 | 13220 | 10530 | 2690 | 0.721 | 0.022 | 5.8 | 0.743 |
| 2 | 12510 | 10050 | 2460 | 0.750 | 0.031 | 5.51 | 0.781 |
| 3 | 12780 | 10647 | 2133 | 0.711 | 0.029 | 5.4 | 0.740 |

TABLE 4-2

| Breakout Run | Maximum Torque (ft-lbs.) | Final Turns |
|---|---|---|
| 1 | 12850 | 1.12 |
| 2 | 13020 | 1.45 |
| 3 | 12540 | 1.52 |

From a comparison of dope Example 1 with the comparable structure but with a thin dope-free layer comprising a dry lubricant, in Example 2, as well as from a comparison of dope Example 3 with the comparable structure but with a thin dope-free layer comprising a dry lubricant layer over a corrosion resistant layer, in Example 4, surprising results can be seen. By employing, in combination, a thin and dry, dope-free solution coating in combination with a trapezoidal thread configuration having a very low, positive load flank angle, a very low, positive stabbing flank angle, and a flank-to-flank contact profile, it is possible to achieve a much higher torque value than by using the same thread geometry but with a conventional grease or dope, both during the steps of make-up and break out.

Surprisingly, it also has been found that when using a dope-free configuration with very low and positive flank angle, as taught herein, the torque for the connection increases depending on the decrement of the positive value of stabbing flank angle. That fact is evident from Examples 5 and 6, which follow.

Furthermore, while in theory that Equation (1) should be valid both to describe make up and breakout torques, experimentally it has been discovered that unless a thin, dry lubricant and dope-free solution is used, make-up torque value will reach lesser values due to the time-dependent pressure changes that are produced by grease.

Example 5

In a fifth embodiment, the box 100 and pin 200 members have a flank-to-flank contact thread profile, a load flank angle [$\beta_1$ or a.] of 3° and a stabbing flank angle [$\beta_2$ or b.] of 7° for both the box member 100 and the pin member 200, so as to define a positive, included flank angle [$\delta_\theta$] of 10°. The joint of this embodiment was made up with use of a dope (API 5A3). Data for the make up and breakout of the fifth embodiment can be seen in Tables 5-1 and 5-2, below.

TABLE 5-1

| Makeup Run | Planned Makeup Torque (ft-lbs) | Maximum Torque (ft-lbs.) | Shoulder Torque (ft-lbs.) | Delta Torque (ft-lbs.) | Shoulder Turns (revs) | Delta Turns (revs) | RPM at Shoulder | Final Turns |
|---|---|---|---|---|---|---|---|---|
| 1 | 2300 | 2588 | 0 | 0 | 0 | 0 | 0 | 0.838 |
| 2 | 2300 | 2488 | 0 | 0 | 0 | 0 | 0 | 0.791 |
| 3 | 2300 | 2586 | 0 | 0 | 0 | 0 | 0 | 0.882 |

TABLE 5-2

| Breakout Run | Maximum Torque (ft-lbs.) | Final Turns |
|---|---|---|
| 1 | 2259 | 1.222 |
| 2 | 2248 | 1.75 |
| 3 | 2328 | 2.176 |

Example 6

In a sixth embodiment, the box 100 and pin 200 members have a flank-to-flank contact thread profile, a load flank angle [$\beta_1$ or a.] of 3° and a stabbing flank angle [$\beta_2$ or b.] of 7° for both the box member 100 and the pin member 200, so as to define a positive, included flank angle [$\delta_\theta$] of 10°. The joint of this embodiment was made up with use of a dope-free solution coating having lubricating and/or anticorrosion properties.

Data for the make up and breakout of the sixth embodiment can be seen in Tables 6-1 and 6-2, below.

TABLE 6-1

| Makeup Run | Max Torque (ft-lbs.) | Shoulder Torque (ft-lbs.) | Delta Torque (ft-lbs.) | Shoulder Turns (revs) | Delta Turns (revs) | RPM at Shoulder | Final Turns |
|---|---|---|---|---|---|---|---|
| 1 | 7820 | 0 | 0 | 0 | 0 | 0 | 1.013 |
| 2 | 7840 | 0 | 0 | 0 | 0 | 0 | 0.97 |

TABLE 6-2

| Breakout Run | Maximum Torque (ft-lbs.) | Final Turns |
|---|---|---|
| 1 | 8420 | 1.02 |
| 2 | 8200 | 0.98 |

Example 6 shows that, when the stabbing flank is greater, torque values of make-up and break out, are lower, maintaining the same load flank angle and the dope-free condition.

FIG. 5 is a TABLE that shows the variation of torque with different configurations of load and stabbing flank angles. The first 15 rows define torque values for different thread configurations, where the threads conventionally were coated with API 5A3 dope. The second 15 rows define torque values for different thread configurations, where the threads instead were coated with a dope-free coating very similar to the embodiment of Examples 2, 4 and 6 but within a 7" OD connection.

Figure 6:
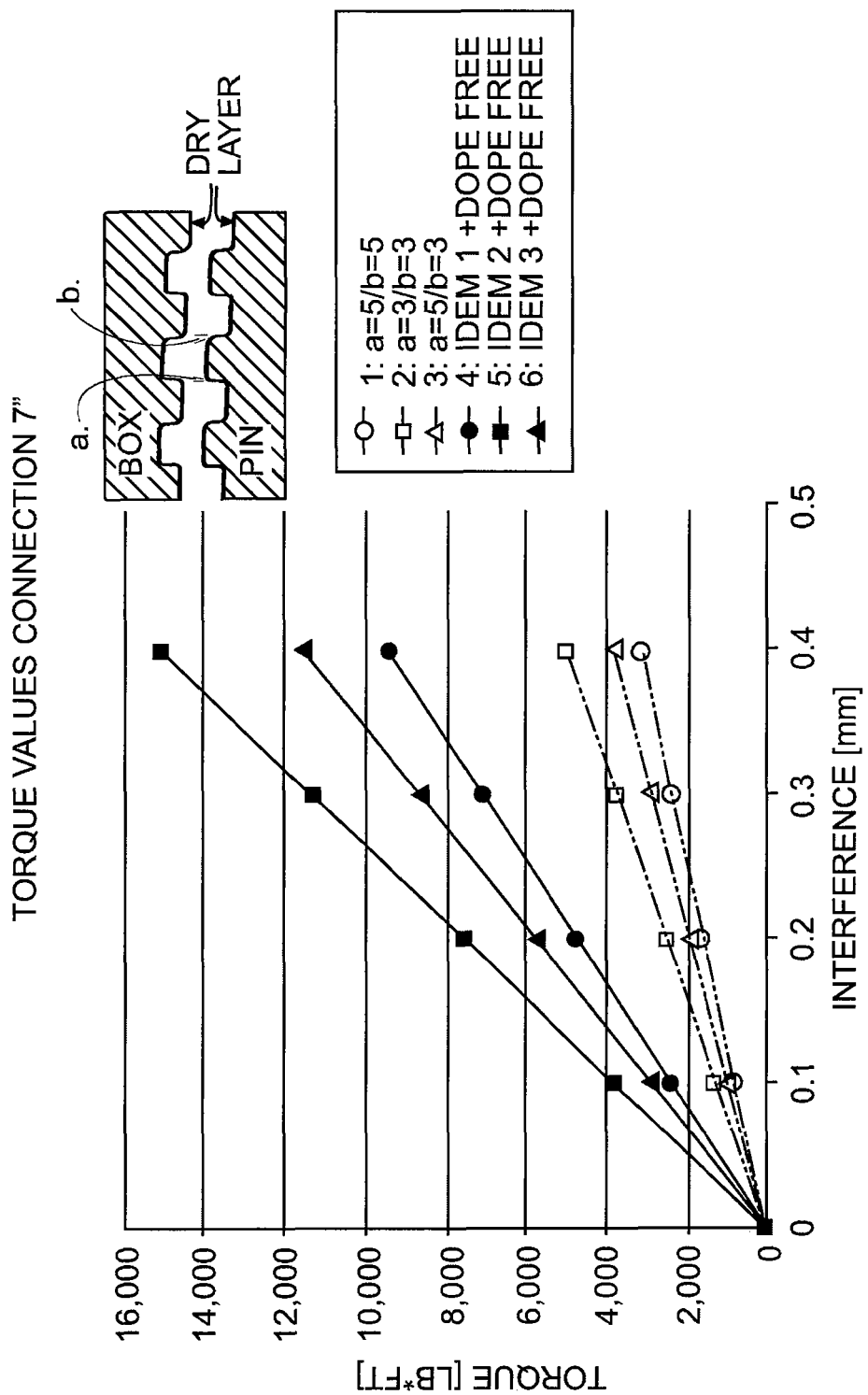
FIG. 6 is a GRAPH illustrating variation of maximum torque for different low load and stabbing flank angle combinations, as a function of different interference values, according to the present invention.

FIG. 6 is a GRAPH that shows the variation of torque values for a representative, 7 inch OD connection with different configurations of load and stabbing flank angles, as function of radial interference. The bottom three curves plot torque values for different thread configurations, where the threads conventionally API 5A3 dope were used. The upper three curves plot torque values for different thread configurations, where the threads instead were coated with a dope-free coating according to the embodiment of Examples 2, 4 and 6 but using a 7" OD connection.

Figure 7:
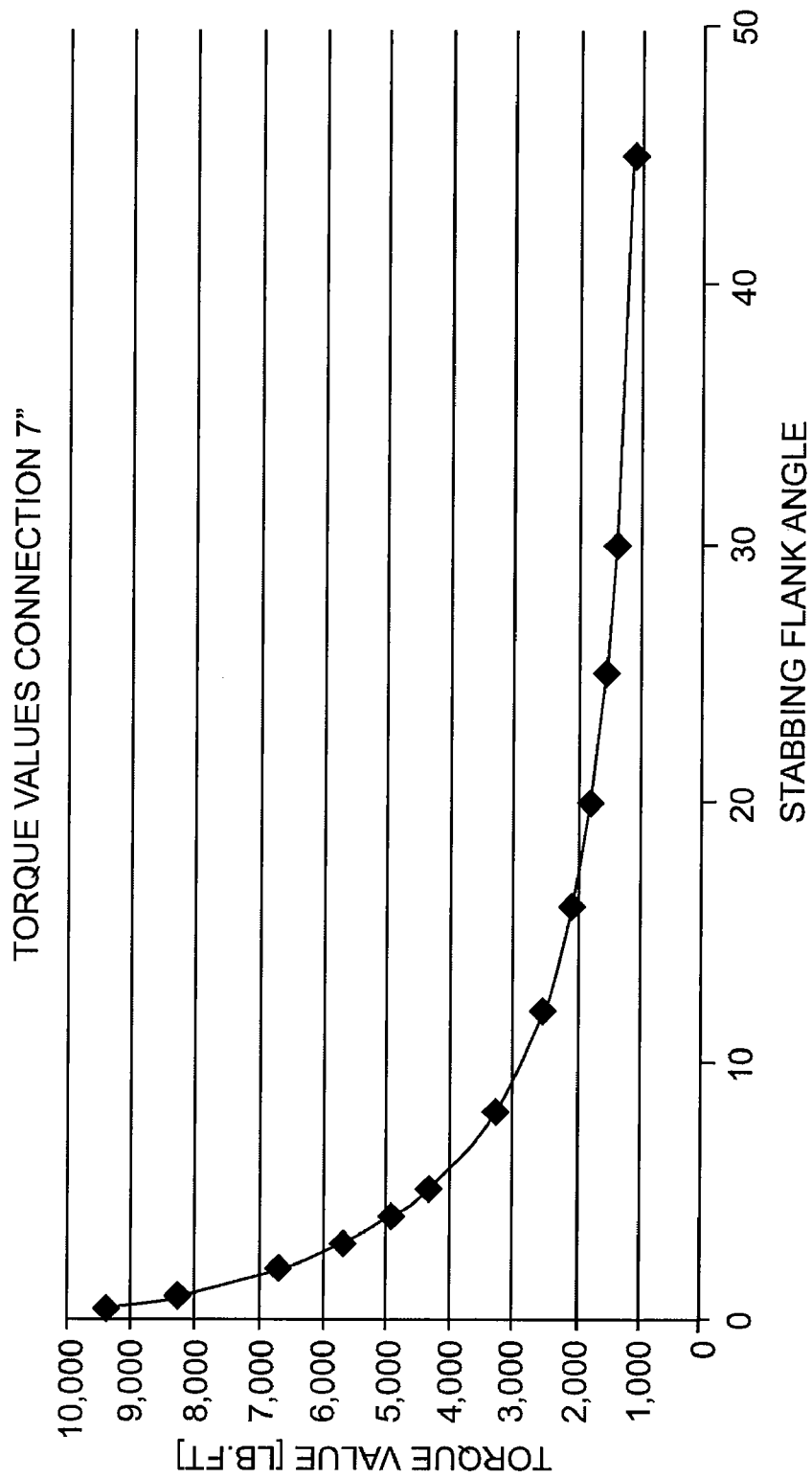
FIG. 7 is a GRAPH illustrating variation of maximum torque as a function of different low to higher stabbing flank angles, according to the present invention.

FIGS. 7 and 8 are respectively a GRAPH and a TABLE that illustrate the unexpected result that maximum torque is very dependent upon an unexpected parameter of thread geometry, and particularly the value of a low, positive stabbing flank angle [$\beta_2$ or b.] between about 0.5° and 45° when using a dope-free coating. FIG. 8 illustrates in a tubular form representative torque values employing a dope-free coating on different trapezoidal threads that each has a constant flank load angle [$\beta_1$ or a.] of about 3°.

FIGS. 7 and 8 also demonstrate the surprisingly higher torques possible with dope-free coatings, at very low, positive stabbing flank angles [$\beta_2$ or b.] approaching a minimum positive value of about 0.5°. This is believed to be a result of the far superior friction factor of a solid, non-viscous dope-free coating. It is important to note that this effect will be more notorious in practice due to the above-mentioned problem of a viscous dope pressure effect in these types of thread geometries.

In order to clarify the concept, and using the formula (1), it is possible to compare the torque values of a load flank angle of 3° and a stabbing flank angle that varies from 0.5° to 45°. The maximum torque values for a similar dope coated connection will be much lesser that what is illustrated by FIGS. 7 and 8.

With a stabbing flank angle that is decreased below 15°, the torque value increases notoriously, to torque values that quickly exceed 2,000 lb. ft. It also can be seen from FIG. 7 that torque variation from varying a stabbing flank angle between 15° and 45° (or higher) is not significant, so it would not be useful to seek a high torque value by choosing a stabbing flank angle higher than 15°.

The invention claimed is:

1. A high torque threaded joint comprising a box member having female threads and a pin member having male threads configured to mate with the threads of the box member,
   wherein the box member and the pin member have a trapezoidal thread profile and thread pitch adapted for a simultaneous mating contact between load flanks and stabbing flanks and a low value of radial interference,
   wherein a load flank angle and a stabbing flank angle, as measured from a plane perpendicular to the longitudinal axis of the joint, are each of a low, positive value and range between approximately 3° to approximately 15°,
   wherein an included angle between the load flank surface and the stabbing flank surface of a thread is positive and is less than 20°, and
   wherein further at least one of the pin and the box threads are coated with a thin layer of a dope-free solid material, that comprises a dry lubricant.

2. The high torque threaded joint according to claim 1, wherein the positive load flank angle is between approximately 3° and 10° and the positive stabbing flank angle is less than 15°.

3. The high torque threaded joint according to claim 2, wherein the positive load flank angle is between approximately 3° and 5° and the positive stabbing flank angle is less than 12°.

4. The high torque threaded joint according to claim 3 wherein the positive load flank angle is approximately 3° and the positive stabbing flank angle is approximately 5°.

5. The high torque threaded joint according to claim 3 wherein the positive load flank angle is approximately 3° and the positive stabbing flank angle is approximately 3° or less.

6. The high torque threaded joint according to claim 1, wherein the threads of at least one of the box member and the pin member further comprise chamfers at intersections of a load flank surface and a stabbing flank surface with a thread crest surface and a thread root surface.

7. The high torque threaded joint according to claim 1, wherein the threads of at least one of the box member and the pin member further comprise grooves at crests or roots.

8. The high torque threaded joint according to claim 1, wherein the included angle between the two flank surfaces of a thread is positive and ranges from between approximately 6° and 17°.

9. The high torque threaded joint according to claim 1, wherein the included angle between the two flank surfaces of a thread is positive and ranges from between approximately 6° and 8°.

10. The high torque threaded joint according to claim 1, wherein the radial interference ranges from between approximately 0 mm. and 0.5 mm.

* * * * *